United States Patent [19]

Stephens

[11] 4,048,144

[45] * Sept. 13, 1977

[54] PREPARATION OF SOLID POLYMERS FROM AROMATIC PRIMARY DIAMINE AND ACYL HALIDE OF TRIMELLITIC ANHYDRIDE

[75] Inventor: James R. Stephens, Gary, Ind.

[73] Assignee: Standard Oil Company (Indiana), Chicago, Ill.

[ * ] Notice: The portion of the term of this patent subsequent to Nov. 18, 1992, has been disclaimed.

[21] Appl. No.: 601,798

[22] Filed: Aug. 4, 1975

Related U.S. Application Data

[63] Continuation of Ser. No. 596,765, Nov. 25, 1966, Pat. No. 3,920,612, which is a continuation-in-part of Ser. No. 252,557, Jan. 21, 1963, abandoned, Ser. No. 336,857, Jan. 10, 1964, abandoned, and Ser. No. 535,367, March 18, 1966, abandoned.

[51] Int. Cl.$^2$ ............................................. C08G 73/14
[52] U.S. Cl. ............................. 260/47 CP; 260/30.2; 260/32.6 NA; 260/63 N; 260/78 TF; 428/474
[58] Field of Search ..................... 260/78 TF, 47 CP

[56] References Cited

U.S. PATENT DOCUMENTS

| | | | |
|---|---|---|---|
| 3,347,828 | 10/1967 | Stephens et al. | 260/78 TF |
| 3,920,612 | 11/1975 | Stephens | 260/78 TF |

*Primary Examiner*—Harold D. Anderson
*Attorney, Agent, or Firm*—Stanley M. Welsh; Arthur G. Gilkes; William T. McClain

[57] ABSTRACT

A process for preparing high molecular weight solid polymers, which process comprises reacting essentially equal molar amounts of a carbocylic aromatic primary diamine and an acyl halide derivative of trimellitic anhydride under essentially anhydrous conditions for a period of time and at a temperature controlled to produce a polymer with free carboxyl groups and amide groups available for further reaction. Also, a process for preparing cured polyamine-imide polymers which comprises heating of the soluble polymers prepared as aforementioned at a temperature above 150° C. sufficient to effectively and substantially convert said carboxyl and amide groups to imide groups and thereby produce a polyamine-imide which is insoluble in organic polar solvents.

7 Claims, No Drawings

PREPARATION OF SOLID POLYMERS FROM AROMATIC PRIMARY DIAMINE AND ACYL HALIDE OF TRIMELLITIC ANHYDRIDE

REFERENCE TO RELATED APPLICATIONS

This is a continuation of application Ser. No. 596,765, filed Nov. 25, 1966, issued as U.S. Pat. No. 3,920,612 (1975), which is in turn a continuation-in-part of Ser. No. 252,557, filed Jan. 21, 1963 (abandoned), Ser. No. 336,857, filed Jan. 10, 1964 (abandoned), and Ser. No. 535,367, filed Mar. 18, 1966 (abandoned).

This invention relates to a process for preparing high molecular weight polymers from trimellitic anhydride derivatives and organic diamines. The polymers produced by this process are used for wire enamel in the protection of electrically conductive metallic wire such as copper. The new polymers produced by Applicant's process are useful for the variety of heat-resistant insulating films, coatings and molded articles.

It has been discovered that a polyamide-imide polymer results from the reaction of a derivative of trimellitic anhydride and a diamine and exhibits surprisingly good wire enamel properties.

The insoluble polymer has both amide and imide linkages and repeating units of

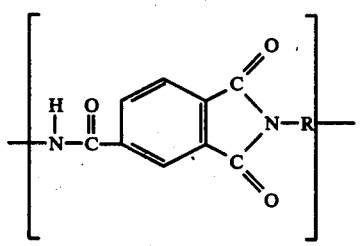

where R is the residue of an organic diamine.

In general, however, the soluble polymers of this invention may be described as polyamides having some polyimide linkages; said polyamides are cpable when heated of conversion to the polyamide-imide form. Such polyamides are high molecular weight polymeric compounds having in its molecule units of

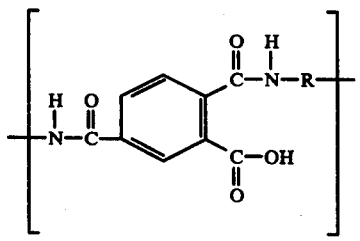

wherein → denotes isomerism and wherein R is a divalent aromatic organic radical. This organic radical consists of R', which is a divalent aromatic hydrocarbon radical or two R' divalent aromatic hydrocarbon radicals joined by stable linkages —O—, —CH$_2$—,

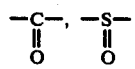

and —S—, as are in the groups —R'—O—R'—, —R'—CH$_2$—R'—,

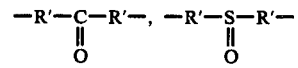

and R'—S—R'—. The molecular weight of these polyamides is sufficiently high to produce upon heating a film-forming polymer. Said amides are susceptible to condensation by heating to a polyamide-imide having to a substantial extent recurring units of

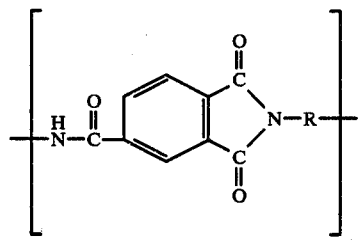

wherein R is a divalent aromatic organic radical which in addition to hydrogen, nitrogen, sulfur and oxygen atoms can be attached to the carbon atoms. This organic radical consists of R', which is a divalent aromatic hydrocarbon radical or two R' divalent aromatic hydrocarbon radicals joined by stable linkages —O—, —CH$_2$—,

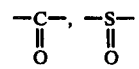

and —S—, as are in the groups —R'—O—R'—, —R'—CH$_2$—, —R'—,

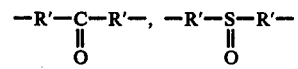

and —R'—s—R'—.

The new polymers of this invention are advantageously prepared by reacting an acyl halide derivative of trimellitic anhydride and an aromatic primary diamine. Such polyamide-imides broadly include two types of useful polymeric products. One type, as indicated above, are the "polyamides", wherein the linking groups are probably predominantly amido although some may be imido and wherein the polymeric structure contains free carboxyl groups which are capable of further reaction. The other type, the polyamide-imides, are the polyamide polymers which have been subjected to further heat treatment and have no free carboxyl group but usually have a significantly high molecular weight. The polyamides, as formed, have from 0 to 45 percent imide linkages. Preferably, the percent imide linkages is controlled to about 20 percent or less in order to provide better solubility permitting easier handling of the product. The polyamide-imides, after heat curing, theoretically contain 50 percent amide linkages and 50 percent imide linkages, although the relative proportions and the relative degree of imidization may be increased by further cross-linking.

The first type of the polyamides of the invention may be regarded as polyamides which are soluble in organic solvents and are capable of further reaction upon application of heat. They may be employed in solution; in high solids' suspensions, or as powders in the production of coatings, laminates, films, fibers, molded products and as impregnating varnishes. The second type of polymers — the polyamide-imides — are much less soluble than the amides and when they have been heat cured they are generally insoluble in organic solvents and may be regarded as a cured end-product in the way of coatings, laminates, films, enamel-wire coatings and the like. The latter are characterized by resistance to solvents, by high thermal stability and good electrical characteristics.

Infrared analyses of the soluble polyamides have shown optical densities as 6.02 N (amide carbonyl) of up to about 10–11 times those at 5.61 N (imide carbonyl) indicating the presence of a high amide content in comparison to the imide content of the polyamide. The infrared data also indicate the presence of carboxyl groups, although determination of their amount is hindered by the close position of the wave length of absorption for the imide carbonyl group.

Infrared analysis of some of the insoluble polymers shown an amide to imide ratio of about 1, indicating that the amide content of the soluble polyamide has been reduced to about 50 percent and the imide content has been increased to about 50 percent. The data also indicate that carboxyl groups are present, if at all, in only small amounts in the insoluble polymers.

Another convenient method for the determination of the present amide and imide linkages in our polyamides and polyamide-imides is by a titration methol. A 2-gram sample of the polymer in a solvent such as N-methylpyrrolidone or dimethylacetamide is titrated with 0.1 Normal NaOCH$_3$ in methanol using Thymol blue as indicator. This assay, a non-aqueous titration, will determine only free carboxyl groups and will not affect imide groups. Both free carboxyl and imide groups are titrated by aqueous 0.1 Normal NaOH, preferably by a back titration method wherein the sample is soaked in 0.1 Normal NaOH, then back titrated with 0.1 Normal HCl to a phenolphthalein end point. From these two titrations, the amount of carboxyl groups and imide groups can be calculated and the amount of amide group determined indirectly.

According to the process of the invention, the new polymeric products are prepared from an acyl halide derivative of trimellitic anhydride (1,2,4-benzene tricarboxylic acid anhydride), having at least one acyl halide and that in the 4-ring position, which include derivatives such as the 4-acid chloride, 1,4- and 2,4-diacid chloride. The bromide and other reactive halide derivatives are also suitable.

The acyl halide derivative is reacted with an aromatic diamine having one or more aromatic rings and two primary amino groups. These aromatic diamines have the formula H$_2$N—R'—NH$_2$, H$_2$N—R'—O—R'—NH$_2$, H$_2$N—R'—CH$_2$—R'—NH$_2$,

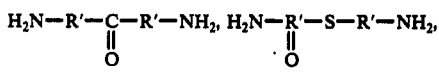

and H$_2$N—R'—S—R'—NH$_2$ wherein R' is a divalent aromatic hydrocarbon radical hereinbefore indicated. The aromatic content of the diamine provides the thermal properties in the polymer while the primary amino groups permit the desired imide rings and amide linkages to be formed in the polymer. Generally the aromatic diamine has from one to about four aromatic rings, advantageously from one to about two aromatic rings. The aromatic diamines having more than one aromatic ring may be further characterized as polycyclic aromatic compounds having two primary amino groups on an interconnected polycyclic aromatic nucleus. The aromatic rings may be interconnected by condensation, as in naphthalene or in phenanthrene-type structure, or may be bridged, either directly as in diphenyl diamines, or indirectly as, for example two R' groups are joined with reactive stable inert linkages such as oxy, carbyl (carbon radical linked to 2 or less hydrogens), carbonyl, sulfonyl, and other relatively inactive groups such as sulfide group as hereinbefore described. The carbyl group may be illustrated by methylene, ethylene, substituted derivatives as 1,1-dimethylmethylene, and the like. Suitable nuclei (R' divalent aromatic hydrocarbon radical) include phenylene, naphthalene, anathrylene, naphthacenylene and the like, diphenylene, terphenylene, phenylnaphthalene, quaterphenylene and the like; and aromatic rings separated by oxy, carbyl, carbonyl, sulfonyl, and thio groups.

Advantageously, the linkages between the aromatic groups are oxy, or methylene, and the amino groups are in the meta or para position in the aromatic nucleus. Preferable diamines are p,p'-methylenebis(aniline), p,p'-oxybis(aniline) and m-phenylenediamine, particularly for the preparation of wire enamels.

Usually, the reaction is carried out in the presence of an organic solvent such as N,N-dimethylacetamide, N-methylpyrrolidone, N,N-dimethylformamide, dimethylsulfoxide and the like, with N,N-dimethylacetamide and N-methylpyrrolidone being preferred. The reaction is suitably carried out under substantially anhydrous conditions and at a temperature below about 150° C. suitably about 70° C. and advantageously at about 50° C. although temperatures down to about 10° C. are also very suitable. The time of reaction depends primarily on the temperature, varying from about 1–24 hours, with 2 to 4 hours at 40°–60° C. recommended. The structure of the amine also affects the rate of reaction. The insoluble polyamide-imides which have a melting point above 300° C. are prepared by heating the polyamides at temperatures above 100° C. preferable at temperatures of 300° to 400° C.

The reactants are preferably present in essentially an equimolar ratio. Variation with limits of plus or minus three mole percent of either starting material will usually have only minor effects on product properties. Variations as high as plus or minus ten mole percent may be suitable for less demanding applications than wire coating enamels from the standpoint of high flexural requirements.

The initial reaction between the acyl halide derivative of trimellitic anhydride and the diamine results in a high molecular weight polyamide having an amide content of greater than about 50 percent of the linking units in the polymer. The amide content varies from 55 to 100 percent and the imide content is from 0 to 45 percent. Such products are readily soluble in such organic solvents as dimethylacetamide, N-methylpyrrolidone, N,N-dimethylformamide, N,N-dimethylsulfoxide and the like.

The reaction is a process for preparing high molecular weight solid polymers having film-forming properties and having solubility in an organic solvent, which process comprises reacting essentially equimolar amounts of an aromatic primary diamine and an acyl halide derivative of trimellitic anhydride which contains at least one acyl halide group and that in the 4-ring position, in an organic solvent, under substantially anhydrous conditions and for a period of time and at a temperature controlled to produce a polymer with free carboxyl groups and amide groups available for further reaction, the polymer being soluble in said organic solvent.

The polymers have a minimum inherent viscosity when dissolved in a solvent such as N,N-dimethylacetamide, of about 0.2 (as defined on Page 34 of *Preparative Methods of Polymer Chemistry* (1961) by W. R. Sorenson and T. W. Campbell). Relative viscosity is measured in a thermo-statted bath at 30° C. and the polymer concentration was kept under 1 percent. The formula on Page 34 of the Sorenson and Campbell textbook is used to calculate the inherent viscosity. The minimum inherent viscosity varies somewhat with the particular diamine employed in the reaction. This may be illustrated by the minimum inherent viscosity of about 0.3 for the polyamide from p,p'-oxybis(aniline). Particularly desirable polyamides from p,p'-methylenebis(aniline) and p,p'-oxybis(aniline) exhibit inherent viscosities in the order of 0.3 and 0.5, respectively. These viscosities indicate that the polyamides have molecular weights of about 7000 to 10,000 and above. The molecular weight of the polyamides determined by light scattering techniques is about 7000 to 8000 as determined by the Brice-Phoenix light scattering photometer (Model 1000). Using the same technique on the polyamide-imides, the molecular weights of 9000 to 27,500 and higher are indicated. These polyamide-imides are film-forming.

The defined polyamide of the first reaction as described hereinbefore is soluble in organic solvents, usually in appreciable amounts. Using N,N-dimethylacetamide as solvent, solutions containing about 15 to about 50 percent solids by weight are obtainable. For applications requiring use of solutions for producing wire coatings, impregnating varnishes and the like; solutions of about 25 to 40 weight percent and advantageously about 35 percent are desired. Such concentrations provide solutions with a good balance between solids content and solution viscosity for ease of handling in most practical applications. The viscosities of such solutions are in the range of 10 to 400 poises. For example, the viscosity of N,N-dimethylacetamide solutions having about 30 percent solids is about 50 poises.

By way of a particular example, a 4-acid chloride of trimellitic anhydride which contains essentially no free trimellitic anhydride is utilized in granular form. The acid chloride and p,p'-methylenebis(aniline) or p,p'-oxybis(aniline) are mixed together in equivalent amounts (± 0.1 mole percent) and the mixture is then added to N,N-dimethylacetamide having less than about 0.3 weight percent of water. The N,N-dimethylacetamide has been previously cooled to 5°-10° C. and is purged with dry nitrogen. During the addition of the reactant mixture, a cooling bath is utilized to keep the solution temperature about 50° C. After about 15-30 minutes when the addition has been completed, positive heating is applied, conveniently by a warm water bath, since the reaction at this point will usually not maintain 50° C. After several hours (about 2), the viscosity of the solution generally is at a maximum value. The polymerization is essentially complete and the reaction mixture is cooled to room temperature and may be held overnight without degradation of the product, but it is preferred to store the mixture at a temperature of about 5° C. at which temperature it can be held for long periods of time without a significant viscosity decrease.

At this stage, the polyamide solution (reaction mixture) is suitable directly for many applications. However, when a wire enamel is desired, it is preferred that the polyamide solution be treated to remove entrained hydrogen halides resulting from the reaction of acyl halide derivative with the diamine. Usually, this may be carried out by either precipitating the polyamide into water, washing the precipitate, and if desired, reformulating the polyamide in the solvent; or by treating the polyamide solution with an alkylene oxide such as ethylene oxide or propylene oxide which reacts with the entrained hydrogen halide to form a compound which can be volatilized off during the second reaction. In the first treatment, the polyamide solution, with entrained hydrogen chloride, is advantageously adjusted to a viscosity of about 150 poises and then poured into a large excess of water gently swirled by an agitating device. The polyamide solution is then poured from a height on the order of about 2 ft. above the water to cause the precipitate to form a continuous thread on the stirring rod. After a loose spool fills the container, the liquid is removed and a polymer soaked for about 1 hour in fresh water where it continues to lose solvent and hydrogen chloride. The operation of draining and soaking the polymer in fresh water is usually repeated two, three times or more. Finally, the polymer threads are soaked overnight and washed one or more times with water. An additional soaking, draining and drying at about 120° F. may be carried out if storage of the polymer for long periods of time is desired. In this state, the polyamide is very easy to formulate with a solvent as its large surface area provides easy solution.

The precipitate can also be prepared in the form of small particles rather than threads by pouring the polyamide solution into water violently agitated by a chopper device such as Cowles dissolver. The chopper device cuts the precipitate into small particles which can usually be weighed and transported more conveniently than the precipitated thread.

The polyamide also can be directly treated in solution to remove the entrained halides. For example, a scavaging reagent such as an alkylene oxide may be added to the solution to convert the entrained halide to a form which does not degrade the polyamide and can be volatilized off during the second reaction. Illustrative of this treatment is the addition of ethylene or propylene oxide to a polyamide solution in amounts of about 1-8 moles of oxide, preferably 1-1.5 moles per mole of halide (calculated from the defined acyl halide derivative) which produces satisfactory results with times of treatment being 1 hour or less at 50° C. or preferably 2-3 days at room temperature. As noted above, the soluble polyamides, according to more specific aspects of the invention, are converted to tough, infusible and insoluble polyamide-imide resins by an internal imidization reaction, inducible by heat. Advantageously, this is accomplished in the process of forming films, coatings, fibers, impregnated and molded articles. For example, a solution of the product, that is the polyamide, treated to remove entrained halides, is applied to a wire or other surface, and heated at a temperature of about 200° to about 420° C., usually about 300°-400° C. (for wire coatings), for a time sufficient to form the insoluble polyamide-imide. At 400° C., about 1 minute is usually sufficient, while at 300° C., about 2 minutes are required.

In this manner, surfaces, sheets, etc., made out of metal like steel, aluminum, nickel, etc., for example; or various alloys, can be coated. Similarly, laminated objects having a plurality of layers bonded together with the polyamide-imide polymer can be made. Each layer is made up of a polyamide on the material to be laminated which has been converted to the polyamide-imide. The lamination is carried out by placing the object to be laminated in the polyamides of this invention dissolved in an organic solvent and then curing under elevated temperatures each layer. As one layer of the polyamide is converted into polyamide-imide, the objects can be again placed in the polyamide solution and the process continues. A fabric or any other piece of clothing made out of cotton, nylon, wool, or any other material can be coated by depositing the polyamide inssolution on said fabric and then heat curing it, which converts a polyamide to the polyamide-imide form.

In another aspect of this invention, the conversion of the soluble polyamide into the insoluble polyamide-imide form is accomplished by curing the soluble polymer for a period of time and at an elevated temperature sufficient to effectively and substantially convert the carboxyl and amide groups to imide groups, and thereby produce a second polymer which is insoluble in the organic solvent.

The polyamide-imide of this invention has generally a molecular weight in excess of about 7000 and is further characterized by being insoluble, infusible, flexible and tough. The properties of this polyamide-imide, when cast in a film, show that it has a tensile strength at 25° C. of between 10,000 and 15,000, has an elongation at 25° C. from 10 to 25 percent, has excellent electrical properties and thermal stability.

In another specific aspect of the invention, the partially polymerized, or uncured, polyamides may be de-imidized to produce products of enhanced solubility, permitting use in the form of solutions of high solids content and relatively low viscosity. For instance, when a solution of the polyamide high solids content and low viscosity is desired for impregnating purposes, the soluble polyamide is first treated to enhance its solubility in relation to the viscosity of the resultant solution. This treatment is accomplished with an aqueous solution of a dilute alkali such as sodium hydroxide, potassium hydroxide, their carbonates, bicarbonates and the like (usually 0.1 N - 0.5 N NaOH or KOH). Thereafter, the product of such treatment is treated with an aqueous solution of dilute acid such as sulfuric, hydrochloric, nitric or other mineral acid, and usually 0.1 N - 0.5 N HCl to form a polymeric product which exhibits enhanced solubility in an organic solvent.

Advantageously, the polymer is in solution when treated with the alkali solution and forms a polyamide precipitate which is subsequently treated with the acid solution. The acid treated precipitate is then redissolved in the same solvent or other suitable organic solvent to produce a solution which exhibits an improved solids content in respect to its viscosity. For example, the above treatment will convert a polyamide, which may be dissolved in N,N-dimethylacetamide to form a solution of 20 percent solids at a viscosity of 100 poises, into a polyamide which may be dissolved in N,N-dimethylacetamide to form a solution of 35 percent polyamide solids in the same viscosity. Alternatively, if lower viscosities are desired, a solution with N,N-dimethylacetamide or N,N-dimethylformamide having a 15 percent solids content at 30 poises, may be converted, for example, by the above treatment into a solution with the same solvent having a 15 percent solids content at about 0.6 poise.

The above treatment results in polymers which are soluble in the defined solvents, preferably N,N-dimethylacetamide and N,N-dimethylformamide, over the range of 15 to 70 percent solids content and have viscosities dependent on the solids content but in the range of about 1 to 50 poises.

The invention is further exemplified by the following Examples:

EXAMPLE I

A mixture containing 1.05 g. (0.005 mole) of 4-acid chloride of trimellitic anhydride (prepared from trimellitic anhydride and thionyl chloride), 1.00 g. (0.005 mole) of p,p'-oxybis(aniline), 6 g. of N,N-dimethylacetamide (as a solvent), and 6 g. of toluene (as a solvent) in a 3 neck glass flask was purged with nitrogen. An exothomeric reaction took place producing a maximum temperature of 40° C. in a few minutes. The temperature subsided back to room temperature after 30 minutes of stirring. The purge was continued slowly. The solution increased in viscosity, and in about 2 hours the viscosity leveled off. The solution was left standing closed to air at room temperature for 16 hours to complete the reaction. A viscous solution was produced.

Some of the viscous solution was added to a large volume of acetone, whereupon precipitation took place. The precipitate was titrated several times with fresh portions of acetone, then dried in a desiccator. This material analyzed for 6.28% N and 0.51% Cl. The theoretical values for the following structure of infinite chain length are 7.56% N and 0% Cl.

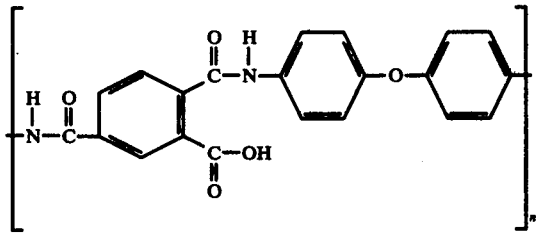

where n is at least about 10.

Infrared analysis showed that the product contained the carboxyl group and both the amide and the imide group.

Another portion of the viscous solution was spread as a film and heated for 2 hours at 150° C. in an oven. The yellow polymeric material (polyamide-imide) analyzed for 7.67% N and 1.66% Cl. compared to theoretical values of 7.87% N and 0% Cl for the following structure of infinite chain length:

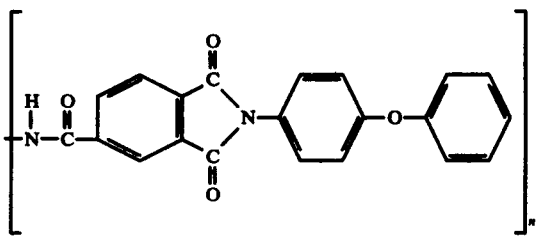

Infrared analysis of the polyamide-imide agreed well with the above structure and showed a ratio of amide to imide groups of 1.

The above results demonstrate that a polyamide was initially formed and that the subsequent heating produced a polyamide-imide.

EXAMPLE II

Using the procedure of Example I, a mixture of 421.24 grams of 4-trimellitoyl chloride anhydride and 400.48 grams of p,p'-oxybis(aniline) was added to 2200 ml of dimethylacetamide, keeping the temperatures between 20° and 40° C. and was stirred overnight. The viscous reaction mixture was then poured into a large excess of water and the precipitated polymer was washed several times with water, then with several portions of acetone, and it was finally dried 3 days at 38° C. in a vacuum oven and it had the following analysis of 7.45 percent nitrogen in a theoretical value of 7.56. This further supports the structure proposed in Example I for the polyamide polymer.

EXAMPLE III

Two thousand two hundred milliliters of dry N,N-dimethylacetamide was stirred and purged with nitrogen at room temperature in a glass flask. Then, 20 g. portion of 4-acid chloride of trimellitic anhydride and p,p'-oxybis(aniline) were added alternately to the contents of the flask. A total of 421.24 g. of the acid chloride and 400.48 g. of the amine were added at such a rate that the temperature of reaction remained at 20°-40° C. Stirring and nitrogen purging was then continued for 16 hours.

The final viscous solution was poured into a large excess of agitated water which resulted in the formation of a precipitate. The precipitated polymer was then washed several times with water to remove residual HCl and solvent. It was then washed with acetone, washed again with water and then dried in a vacuum oven at about 35° C.

The polymer free of hydrochloric acid was then reformulated by dissolving 500 g. of it in 1000 ml of N,N-dimethylacetamide. This solution was then further diluted with 690 g. of toluene to match the percent solids of an available solution of a polymer derived from pyromellitic dianhydride and p,p'-oxybis(aniline) in N,N-dimethylacetamide and toluene.

A portion of the material in N,N-dimethylacetamide and toluene was spread as a film on a 24-gauge copper plate and baked at approximately 400° F. for 10 minutes. The dry polyamide-imide film was ½ mil in thickness and was a transparent yellow.

EXAMPLE IV

The dry polyamide-imide film of Example III was compared with a polyimide film, commercially utilized as a wire enamel, which is prepared from pyromellitic dianhydride and p,p'-oxybis(aniline). The polyimide film was prepared at the same baking temperature (400° F.) and same baking time (10 minutes) as the polyamide-imide film.

The reverse impact resistance of both films was over 160 in. lbs. which is very satisfactory. A measure of heat resistance was determined by subjecting each film to the flame of a bunsen burner. Both films exhibited very good thermal stability. Both films were also subjected to a caustic test where a drop of 2% NaOH was placed on each film and allowed to remain overnight. The standards of this industrial test are pass (the film being essentially unattacked by the caustic) and fail (the film being solubilized, broken, or lifted by the caustic.) The polyamide-imide film passed while the polyimide film failed. After being baked for 20 minutes (an increase of 10 minutes) at 400° F., a film of the polyimide passed the test, although a dark spot was produced on the film from the caustic. The polyamide-imide when baked for this longer time was also caustic resistant without being darkened by the caustic.

EXAMPLE V

Additional tests were carried out to further determine the properties of the polyamide-imide films in comparison with those of the polyimide. Samples of glass cloth impregnated with the polymers were made up from their solutions. In each case, the impregnated glass cloth sample was baked for about 30 minutes at about 600° F. Tests were then carried out in 5 percent caustic solutions and in 5 percent nitric acid solutions, each in glass bottles. In each test, samples of the impregnated cloth were submerged in the test solution. The bottles containing the solutions and glass cloths were then covered and stored for 30 days in the caustic test and for 3 weeks in the nitric acid test. In the caustic test, the polyamide film exhibited no noticeable attack after 30 days while the polyimide coating was dissolved after approximately 11 days. In the acid test, the polyamide-imide was not noticeably attacked upon completion of a 3-week period while the polyimide coating was decidedly softened after the same 3-week period.

EXAMPLE VI 4-acid chloride of trimellitic anhydride and p,p'-methylenebis(aniline) was mixed together in equimolar portions and then were added to N,N-dimethylacetamide to produce a solution having about 33 percent solids. The addition of the mixture was carried out in about 45 minutes at an initial temperature of about 5°-10° C. which rose during the addition to about 50° C. and was controlled at that point by a cooling bath. When the exothermic reaction was over, the reaction mixture was held at 50° C. for about 2-2½ hours and then gradually cooled to 30° C. taking about 1-2 hours. The solution was forced under pressure into a reservoir of recirculating water (about four parts of water per part of solution) which was being violently agitated.

The precipitated solids were collected in a net, transferred to a surge tank and subjected to several water soakings until the effluent was neutral and the index of refraction was about 1.33 or that of pure water. The precipitate was then drained dry at a temperature between 120° F. and 300° F. The dry precipitate was then formulated in a solvent mixture of two parts of N-methylpyrrolidone and one part of N,N-dimethylacetamide to a solids content between 20-35 percent by weight.

This reformulated solution was very suitable for producing a film having properties similar to those of the polyamide-imide product of Example III. In the above technique for preparing the polymer solution, the entrained hydrogen chlorides were substantially removed by the above-described water washings. The result was a very suitable solution for producing wire coatings.

EXAMPLE VII

Treatment of the first stage polymer was carried out to improve its solubility characteristics. Said polymer was prepared from a mixture of 842.28 g. of 4-acid chloride of trimellitic anhydride and 792.95 g. of p,p'-oxybis(aniline) which was added to about 3525 ml. of N,N-dimethylformamide at about 14° C. over about a 15 minute period. The reaction temperature rose to about 55° C. Then about 1175 ml. of N,N-dimethylacetamide was added and the reactive mixture was stirred at about 50° C. for about 4 hours and its viscosity was then 150 poises.

A portion of the solution was poured into a large excess of water where in coagulated in yellow threads. The threads were washed several times with water, soaked overnight in water, and then drained and dried at room temperature under a current of air. The dry threads were dissolved in N,N-dimethylformamide to produce a solution having 15 percent solids and a viscosity of 30 poises.

A second portion (about 86 g.) of the solution was poured into about 1 liter of ½ N KOH (in water) to form a precipitate of white threads. After soaking 1 hour in this medium, the threads were removed, washed with water and soaked in ½ N HCl (in water) for about 1 hour. They were then washed with water, soaked overnight in water, drained and dried at room temperature in a current of air. The dry threads were dissolved in N,N-dimethylformamide to produce a solution having 15 percent solids and a viscosity of 0.6 poise. A second solution having 35 percent solids in the same solvent was prepared and had a viscosity of 100 poises.

The solutions with 15 percent and 35 percent solids were applied to copper and panels and baked 2 minutes at 600° C. to produce clear, tough coatings that passed a flexibility test on a ⅛ inch mandrel, and withstood 160 in. lbs. of impact both at the crease and at a flat surface.

The above results demonstrate that the solubility characteristics of the polymer produced in the first two paragraphs of this Example was improved by the treatment with KOH and HCl. The polymer solution before treatment contained 15 percent solids and exhibited a viscosity of 30 poises. After the polymer solution had been treated, the solution of 15 percent solids exhibited a viscosity of 0.6 poises, a remarkable decrease in viscosity from 30 poises to 0.6 poise. Yet, this solution as well as that with 35 percent solids produced clear, tough coatings which exhibited good flexibility and impact ratings.

EXAMPLE VIII

A solution of 287.61 g. of m-phenylene diamine in 1831 g. of N-methylpyrrolidone was adjusted to 25° C. Then with stirring and purging with nitrogen, 560.02 g. of 4-trimellitoyl chloride anhydride was added to it over a period of one hour. During this time, the temperature of the exothermic reaction was allowed to reach 50° C., then held at that temperature by cooling. An additional 133 g. of N-methylpyrrolidone was added and the temperature of the mixture maintained at 50° C. for an additional 1¼ hours.

The viscous polymeric solution was then processed further in two ways:

1. One half of the reaction mixture was poured slowly into four liters of violently agitated water. The resulting precipitate was filtered then washed several times with distilled water, soaked overnight in distilled water and washed again with distilled water. It was then dried in a vacuum overnight at 50° C. These solids could be dissolved in dimethylacetamide or N-methylpyrrolidone to yield viscous solutions that when case on metal and baked 3 minutes at 600° F. gave clear continuous films of greater than 160 in. lbs. of reverse impact.

2. One-half of the reaction solution was cooled to 25° C. then a solution of 88.9 of propylene oxide in 69.2 g. of N-methylpyrrolidone was added over a period of 3 hours, 20 minutes. During this time the temperature of the mildly exothermic reaction was controlled at 28° C. The solution was then cooled to 25° C. and inspected:
Viscosity — 29 poises (brookfield)
Non-aqueous titer — 3.30 meq. COOH/gram of solids.

The solution was cast at 3 mils wet on a copper panel and baked at 600° F. for 3 minutes to yield a clear continuous film that had a reverse impact of greater than 160 in. lbs.

EXAMPLE IX

A polyamide-imide film prepared as in Example III displayed the following properties:
Elongation: At 25° C. — 10% (determined according to ASTM D-882-61T)
Tear strength: 200 gram/mil (determined according to ASTM D-1004-59T)
Dielectric strength of films: 6 mil film — 2,000 volts/mil; 2 mil film — 3,450 volts/mil (determined according to ASTM D-149-61 and ASTM D-150-59T)
Initial modulus: At 25° C. — 80,000 p.s.i.
Tensile strength: At 25° C. — 10,000 p.s.i.
Thermal stability: Greater than 12 hours at 310° C. in air.

Other polyamides may be prepared following the procedures of the above Examples with the 4-acid chloride of trimellitic anhydride and other aromatic primary diamines such as p-phenylene diamine and m-phenylene diamine. The films of these polyamides have very desirable film properties.

While the invention has been described in conjunction with specific examples thereof, these are illustrative only. Accordingly, many alternatives, modifications and variations will be apparent to those skilled in the art in the light of the foregoing description, and it is therefore intended to embrace all such alternatives, modifications and variations as to fall within the spirit and broad scope of the appended claims.

I claim:
1. A process for preparing high molecular weight solid polymers having film-forming properties and being soluble in an organic solvent, which process comprises (a) reacting essentially equimolar amounts of a carbocyclic aromatic primary diamine and an acyl halide derivative of trimellitic anhydride which contains at least one acyl halide group and that in the 4-ring position, in said organic solvent, under substantially anhydrous conditions, and for a period of time and at a temperature, below 150° C., controlled to produce a polymer with free carboxyl groups and amide groups available for further reaction, said polymer being soluble in said organic solvent and wherein the reaction produces hydrogen halide, and (b) washing with water said polymer.

2. A process of preparing cured polyamide-imide polymers which process comprises the heating of the polyamide prepared by the process of claim 1 for a period of time and at a temperature above 150° C. sufficient to effectively and substantially convert such carboxyl and amide groups to imide groups, and thereby produce a polyamide-imide which is insoluble in said organic solvent.

3. The process of claim 1, wherein the acyl halide derivative of trimellitic anhydride is the 4-acid chloride of trimellitic anhydride.

4. The process of claim 3, wherein the aromatic primary diamine is p,p'-methylenebis(aniline).

5. The process of claim 3, wherein the aromatic primary diamine is p,p'-oxybis(aniline).

6. A process for preparing cured polyamide-imide polymers which process comprises the heating of the polyamide prepared by the process of claim 4 for a period of time and at a temperature above 150° C. sufficient to effectively and substantially convert such carboxyl and amide groups to imide groups, and thereby produce a polyamide-imide which is insoluble in said organic solvent.

7. A process for preparing cured polyamide-imide polymers which process comprises the heating of the polyamide prepared by the process of claim 5 for a period of time and at a temperature above 150° C. sufficient to effectively and substantially convert such carboxyl and amide groups to imide groups, and thereby produce a polyamide-imide which is insoluble in said organic solvent.

* * * * *